Dec. 11, 1945.  H. W. BERRY  2,390,824
PHASE INVERTER
Filed July 27, 1943
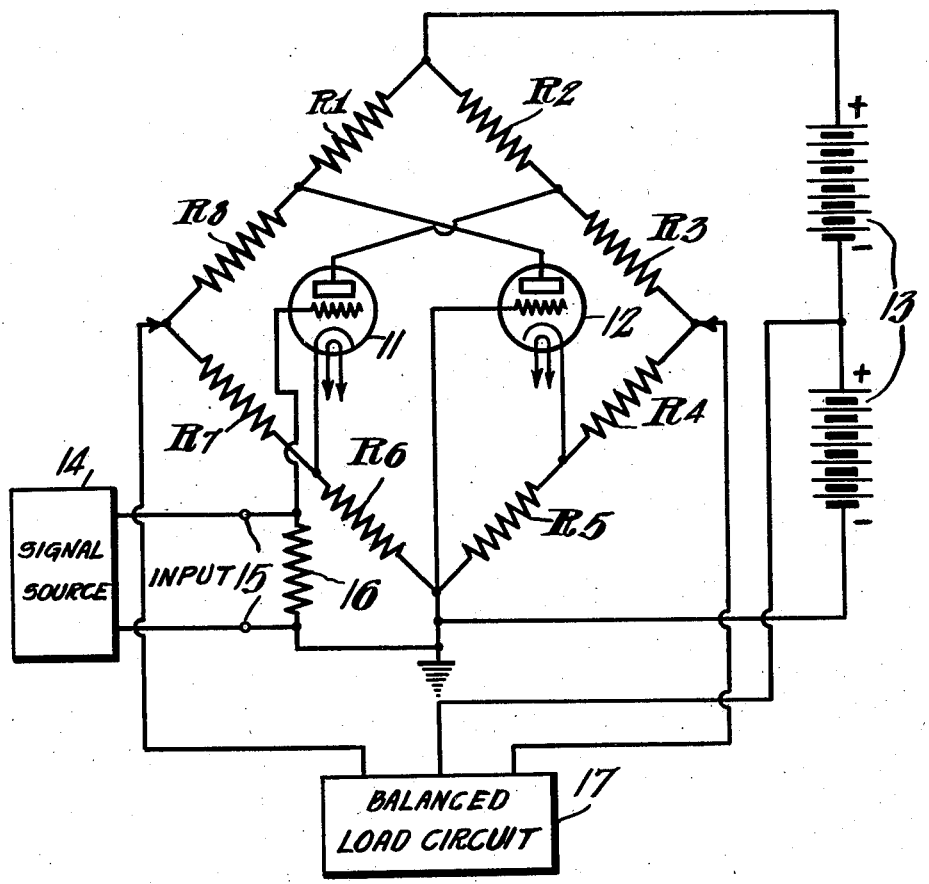
Inventor
Henry W. Berry
By
C D Tuska
Attorney Patented Dec. 11, 1945

2,390,824

UNITED STATES PATENT OFFICE 2,390,824

PHASE INVERTER

Henry W. Berry, West Collingswood, N. J., assignor to Radio Corporation of America, a corporation of Delaware Application July 27, 1943, Serial No. 496,369

7 Claims. (Cl. 178—44)

This invention relates generally to thermionic discharge tube amplifying circuits and more particularly to a phase inverting bridge amplifier for driving a push-pull D. C. amplifier stage.

Briefly, the invention comprises a phase inverting bridge circuit including a plurality of serially-connected resistive elements forming a Wheatstone bridge, and having two substantially identical thermionic discharge tubes connected between mutually balanced points in the bridge circuit. A source of anode voltage is applied to the bridge in a manner to provide symmetrical paths for the anode currents to both of the thermionic tubes, whereby variations in the anode current supply will not cause unbalance of the normally balanced bridge. A source of signals to be amplified is applied to the control electrode circuit of one of the thermionic tubes, causing unbalance of the bridge in response to the applied signals. The second thermionic tube has a degenerative action upon the unbalancing action of the first thermionic tube upon the bridge. Output signals are derived from selected points of the bridge resistive network to provide voltages which are oppositely phased with respect to a point of reference potential in the bridge circuit. Cathode bias for each of the thermionic tubes is obtained through separate balanced arms of the bridge network. These bias resistors, which are not by-passed, also provide considerable degeneration in the circuit. Filament, or heater, current is supplied to the two tubes from a common voltage source whereby thermionic emission in the two tubes will vary equally insofar as the emission depends upon the heating current.

The circuit has wide utility and distinct advantages in all types of communication networks and has particular utility in networks of the type providing amplification of signals over an extremely wide frequency band which extends to zero frequency. The circuit is particularly adapted for the coupling of an unbalanced amplifier stage to a balanced or push-pull amplifier stage, and is particularly useful in circuits wherein the thermionic tube operating voltages are not closely regulated.

Among the objects of the invention are to provide an improved phase inverter for deriving oppositely phased signals from a source of unbalanced signal voltages. Another object of the invention is to provide an improved phase-inverting bridge circuit including a plurality of resistors arranged in a Wheatstone bridge, and a pair of thermionic discharge tubes connected between mutually balanced points on said bridge, whereby signals applied to one of said discharge tubes provides unbalance of the bridge in response thereto, and means for deriving from said bridge signals balanced with respect to a point of reference potential in the circuit. Another object of the invention is to provide an improved phase-inverting bridge amplifier for coupling signals from an unbalanced circuit to a balanced circuit, wherein the amplification and phase characteristics of the bridge network are substantially unaffected by normal variations in operated potentials applied to the thermionic tubes.

The invention will be described in further detail by reference to the accompanying drawing of which the single figure is a schematic circuit diagram of a preferred embodiment thereof.

Referring to the drawing, the circuit includes a Wheatstone bridge comprising eight serially-connected resistors $R1$, $R2$, $R3$, $R4$, $R5$, $R6$, $R7$ and $R8$ in the order named. The remaining terminals of the first and eighth resistors $R1$ and $R8$, respectively, are connected together to form a closed bridge. The anode of a first thermionic discharge tube 11 is connected to the junction between the second and third series resistors $R2$, $R3$. The cathode of the first amplifier tube 11 is connected to the junction between the sixth and seventh resistors $R6$, $R7$.

The anode of the second thermionic discharge tube 12, of substantially identical characteristics to the first discharge tube 11, is connected to the junction between the first and eighth resistors $R1$, $R8$ respectively. The cathode of the second discharge tube 12 is connected to the junction between the fourth and fifth series resistors $R4$, $R5$, respectively. The control electrode of the second discharge tube 12 is connected to the junction between the fifth and sixth resistors $R5$, $R6$ respectively, which junction, if desired, may be grounded. The grounded junction of the fifth and sixth series resistors $R5$, $R6$, is connected to the negative terminal of a source of anode potential 13, which is indicated on the drawing as a conventional anode battery. The positive terminal of the anode voltage supply 13 is connected to the junction of the first and second resistors $R1$, $R2$ respectively.

The values of the first, second, fifth and sixth resistors are identical, and are selected to provide suitable grid bias potential for the first and second thermionic tubes 11, 12 respectively. The values of the third, fourth, seventh and eighth resistors also are identical, and are selected to provide suitable load resistances for the anode circuits of the two thermionic tubes. It should be understood that the actual values of the resistors may be varied to provide best performance for the particular thermionic tubes selected for particular circuit applications. Triodes have been illustrated in the drawing but any other types of amplifier tubes may be substituted therefor.

It should be understood that the anode voltage supply 13 may be any type of regulated or unregulated source of direct voltage. Heater or filament voltage for the cathodes of the two thermionic discharge tubes should be supplied from a common voltage source in order that variations in emission due to source fluctuations will be substantially identical in both tubes. Since anode potential is supplied to both thermionic tubes through symmetrical circuits comprising the first and fifth resistors R1, R5 respectively, and the second and sixth resistors R2, R6 respectively, fluctuations in the anode voltage source 13 will provide similar changes in anode and control electrode voltages on both of the thermionic tubes.

The bridge is normally balanced when no input is supplied to the control electrode of the first thermionic tube 11, and anode voltage changes due to fluctuations in the anode voltage supply 13 or the heater voltage supply, will not provide any unbalanced condition in the bridge circuit.

If signals from a source 14 are applied to the input terminals 15, signal voltages will be applied to the control electrode circuit of the first thermionic tube 11. A grid resistor 16 is connected across the input terminals 15 which are connected between the control electrode of the first thermionic tube and the grounded junction of the fifth and sixth resistors R5, R6 respectively.

Connections to a balanced load circuit, 17 such as, for example, the input circuit to a push-pull thermionic amplifier, are taken from the junction of the third and fourth resistors R3, R4 respectively; the junction of the seventh and eighth resistors R7, R8 respectively; and from the center point on the anode voltage supply 13.

In operation, the bridge comprising the eight serially-connected resistors and the two thermionic tubes normally is in a completely balanced condition. Hence, any voltage fluctuations in the anode voltage source 13, or in the voltage supply to the heaters of the thermionic tubes 11, 12, will provide no unbalance of the bridge circuit, since anode and bias voltages are applied symmetrically to both tubes through different bridge resistor arms, as explained heretofore.

Normal control electrode bias is provided by the cathode resistors R5, R6 which also comprise separate balanced bridge arms. Signals, from the source 14, applied to the control electrode of the first thermionic tube 11, provide unbalance of the bridge in response to signal voltage variations. The unbypassed cathode resistors R5, R6 and the second thermionic tube 12 provide considerable degeneration in the bridge circuit, thereby providing great stability and linearity in amplification of the applied signals.

The balanced output signals applied to the balanced load circuit 17 are oppositely phased with respect to the point of reference potential, which in the circuit illustrated is the midpoint of the anode voltage supply 13. Obviously, any other suitable point of reference potential might be selected for the balanced point in the output circuit. In order to compensate for variations in thermionic tube characteristics, the connection to the junction of the third and fourth resistors R3, R4 may be adjustable along either of these resistors to select a point thereon which provides proper bridge balance. If desired, the connection to the junction of the seventh and eighth bridge resistors may likewise be made adjustable along these resistors.

It will be seen that changes in the operating potentials applied to the bridge and to the thermionic tubes will have substantially no effect upon the linearity of the gain or phase-conversion characteristics of the circuit, providing that the input signals from the signal source 14 do not overload the thermionic tubes 11, 12 respectively.

Thus the invention described comprises a novel and efficient phase-inverting bridge amplifier circuit wherein the amplification and phase-inversion characteristics of the circuit are substantially independent of tube operating voltage fluctuations.

I claim as my invention:

1. A phase inverting circuit including a pair of thermionic discharge tubes each having anode, cathode and control electrode circuits, a normally balanced impedance bridge comprising a plurality of serially-connected impedance elements forming a closed loop, means connecting the anode and cathode circuits respectively of each of said tubes to different normally balanced points on said bridge, connections to said bridge including separate ones of said serially-connected bridge elements for applying operating potentials symmetrically to the anode and cathode circuits of said tubes so that said bridge remains balanced notwithstanding variations in operating potentials, means including an unbalanced input circuit for connecting the control electrode circuit of one of said tubes to a source of signals to unbalance said bridge in response to said signals, and means including a balanced output circuit connected to other normally balanced points on said bridge for deriving from said bridge oppositely-phased signals in response to said unbalance of said bridge.

2. A phase inverting circuit including a pair of thermionic discharge tubes each having anode, cathode and control electrode circuits, a normally balanced impedance bridge comprising a plurality of serially-connected impedance elements forming a closed loop, means connecting the anode and cathode circuits respectively of each of said tubes to different normally balanced points on said bridge, connections to said bridge including separate ones of said serially-connected bridge elements for applying operating potentials symmetrically to the anode and cathode circuits of said tubes so that said bridge remains balanced notwithstanding variations in operating potentials, means including an unbalanced input circuit having a single connection to said bridge for connecting the control electrode circuit of one of said tubes to a source of signals to unbalance said bridge in response to said signals, and means including a balanced output circuit connected to other normally balanced points on said bridge for deriving from said bridge oppositely-phased signals in response to said unbalance of said bridge.

3. A phase inverting circuit including a pair of thermionic discharge tubes each having anode, cathode and control electrode circuits, a normally balanced impedance bridge comprising a plurality of serially-connected impedance elements forming a closed loop, means connecting the anode and cathode circuits respectively of each of said tubes to different normally balanced points on said bridge, connections to said bridge including separate ones of said serially-connected bridge elements for applying operating potentials symmetrically to the anode and cathode circuits of said tubes so that said bridge remains balanced notwithstanding variations in operating potentials, a source of signals, means including an unbalanced input circuit having a single connection to said bridge for connecting the control electrode circuit of one of said tubes to said source of signals to unbalance said bridge in response to said signals, and means including a balanced output circuit connected to other normally balanced points on said bridge for deriving from said bridge oppositely-phased signals in response to said unbalance of said bridge.

4. A phase inverting circuit including a pair of thermionic discharge tubes each having anode, cathode and control electrode circuits, a normally balanced impedance bridge comprising a plurality of serially-connected impedance elements forming a closed loop, means connecting the anode and cathode circuits respectively of each of said tubes to different normally balanced points on said bridge, connections to said bridge including separate ones of said serially-connected bridge elements for applying operating potentials symmetrically to the anode and cathode circuits of said tubes so that said bridge remains balanced notwithstanding variations in operating potentials and different ones of said bridge impedance elements provide cathode degeneration for each of said tubes, means including an unbalanced input circuit having a single connection to said degenerative impedance elements of said bridge for connecting the control electrode circuit of one of said tubes to a source of signals to unbalance said bridge in response to said signals, and means including a balanced output circuit connected to other normally balanced points on said bridge for deriving from said bridge oppositely-phased signals in response to said unbalance of said bridge.

5. A phase inverting circuit including a pair of thermionic discharge tubes each having anode, cathode and control electrode circuits, a normally balanced impedance bridge comprising a plurality of serially-connected impedance elements forming a closed loop, means connecting the anode and cathode circuits respectively of each of said tubes to different normally balanced points on said bridge, connections to said bridge including separate ones of said serially-connected bridge elements for applying operating potentials symmetrically to the anode and cathode circuits of said tubes so that said bridge remains balanced notwithstanding variations in operating potentials and different ones of said bridge impedance elements provide cathode bias voltages and degeneration for each of said tubes, means including an unbalanced input circuit having a single connection to said cathode bias elements of said bridge for connecting the control electrode circuit of one of said tubes to a source of signals to unbalance said bridge in response to said signals, and means including a balanced output circuit connected to other normally balanced points on said bridge for deriving from said bridge oppositely-phased signals in response to said unbalance of said bridge.

6. A phase inverting circuit including a pair of thermionic discharge tubes each having anode, cathode and control electrode circuits, a normally balanced impedance bridge comprising a plurality of serially-connected impedance elements forming a closed loop, means connecting the anode and cathode circuits respectively of each of said tubes to different normally balanced points on said bridge, connections to diagonally disposed points on said bridge for applying operating potentials symmetrically through separate ones of said serially-connected bridge elements to the anode and cathode circuits of said tubes so that said bridge remains balanced notwithstanding variations in operating potentials and other separate ones of said bridge elements provide cathode bias voltages and degeneration for each of said tubes, means including an unbalanced input circuit having a single connection to one of said diagonal points on said bridge for connecting the control electrode circuit of one of said tubes to a source of signals to unbalance said bridge in response to said signals, and means including a balanced output circuit connected to other diagonally disposed points on said bridge for deriving from said bridge oppositely-phased signals in response to said unbalance of said bridge.

7. Apparatus as defined in claim 6 including a connection from the grid of the other of said tubes to said common connection of said input circuit and said bridge.

HENRY W. BERRY.